(12) United States Patent
Deng et al.

(10) Patent No.: US 12,170,442 B2
(45) Date of Patent: Dec. 17, 2024

(54) MULTI-PORT MAGNETIC NETWORK ENERGY ROUTER, CONTROL METHOD AND DEVICE

(71) Applicant: SOUTHEAST UNIVERSITY, Jiangsu (CN)

(72) Inventors: Fujin Deng, Jiangsu (CN); Yongqing Lv, Jiangsu (CN); Zhan Shen, Jiangsu (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 18/632,428

(22) Filed: Apr. 11, 2024

(65) Prior Publication Data

US 2024/0388086 A1 Nov. 21, 2024

Related U.S. Application Data

(63) Continuation of application No. PCT/CN2023/128596, filed on Oct. 31, 2023.

(30) Foreign Application Priority Data

May 10, 2023 (CN) .......................... 202310520580.6

(51) Int. Cl.
*H02J 3/00* (2006.01)
*H02M 7/5387* (2007.01)

(52) U.S. Cl.
CPC ............. *H02J 3/00* (2013.01); *H02M 7/5387* (2013.01)

(58) Field of Classification Search
CPC ................................ H02J 3/00; H02M 7/5387
(Continued)

(56) References Cited

U.S. PATENT DOCUMENTS

2019/0252114 A1* 8/2019 Lu ..................... H01F 27/306
2020/0312505 A1* 10/2020 Li ......................... H01F 27/40
(Continued)

FOREIGN PATENT DOCUMENTS

CN 101369480 A 2/2009
CN 104753322 A 7/2015
(Continued)

OTHER PUBLICATIONS

Yang et al., CN 106057433, (Year: 2015).*
(Continued)

*Primary Examiner* — Hien D Khuu

(57) ABSTRACT

Disclosed are a multi-port magnetic network energy router and a control method. A magnetic network energy router includes a dual magnetic plate crimped N-winding transformer containing distributed magnetic core columns, and N full-bridge converters. The control method includes: S1. calculating equivalent connection inductance between different converters; S2. calculating steady-state control phase shift angles on the basis of reference powers of all converters; S3. calculating a power decoupling control matrix; S4. calculating control phase shift angle micro-increments of second to $N_{th}$ converters by the power closed-loop control; and S5. controlling the converters to output square-wave voltages of 50% duty with different phase shift angles, and realizing given-power control. According to the present disclosure, multiple full-bridge converters can be effectively integrated and power density of the system can be improved, and equivalent large leakage inductance can be magnetically integrated at each converter port to realize given high-power energy routing at each port.

5 Claims, 5 Drawing Sheets

(58) Field of Classification Search
USPC .......................................................... 700/295
See application file for complete search history.

(56) References Cited

U.S. PATENT DOCUMENTS

| | | | |
|---|---|---|---|
| 2021/0006178 A1* | 1/2021 | Kumar | H02M 1/15 |
| 2021/0134523 A1* | 5/2021 | Feng | H02M 5/12 |
| 2023/0361599 A1* | 11/2023 | Podhola | H02J 50/10 |

FOREIGN PATENT DOCUMENTS

| | | |
|---|---|---|
| CN | 111722007 A | 9/2020 |
| CN | 112652438 A | 4/2021 |
| CN | 115714543 A | 2/2023 |

OTHER PUBLICATIONS

Ye et al., WO 2015085767 A1, (Year: 2016).*
Xiang et al., CN208985837U (Year: 2019).*
Wongsasulux et al., TWI719898B (Year: 2021).*
Henriksen et al., CN112655059A (Year: 2021).*

* cited by examiner

MULTI-PORT MAGNETIC NETWORK ENERGY ROUTER, CONTROL METHOD AND DEVICE

CROSS-REFERENCE TO RELATED APPLICATIONS

This application is a continuation of PCT/CN2023/128596, filed Oct. 31, 2023 and claims priority of Chinese Patent Application No. 202310520580.6, filed on May 10, 2023, the entire contents of which are incorporated herein by reference.

TECHNICAL FIELD

The present disclosure belongs to the field of isolated power electronic converters, and specifically relates to a multi-port magnetic network energy router and a control method.

BACKGROUND

A magnetic network energy router, adopting an integrated structure of a multi-terminal power electronic converter with a high-voltage high-power multi-winding intermediate-frequency transformer, meets the requirements for access to various forms of power supplies, energy storage, and load devices in the future due to the advantages of flexible port voltage class conversion, electric isolation, and controllable power and power quality, and can significantly improve the performance, efficiency, and reliability of various types of integrated energy systems, attracting much attention in the fields of alternating current (AC)/direct current (DC) hybrid power distribution grids/micro-grids, new energy DC grid-connection, electric vehicle charging stations, and data center power supplies.

Since the coupling characteristics and equivalent leakage inductance between ports of the high-voltage high-power multi-winding intermediate-frequency transformer are different due to different magnetic core structure designs and magnetic integration modes, how to design a magnetic core structure of the high-voltage high-power multi-winding intermediate-frequency transformer and the magnetic integration mode are the key technology to realize a high power density and high capacity, and the efficient and reliable operation of the magnetic network energy router. For the magnetic core structure design, a conventional high-voltage high-power multi-winding intermediate-frequency transformer adopts an EE-type magnetic core or a UU-type magnetic core. However, the EE-type magnetic core is limited in multi-winding integration capability and the magnetic core surrounds a winding on two sides, and a larger window area is needed influenced by insulation safety distance, thereby reducing a power density of the multi-winding transformer. The UU-type magnetic core is also limited in multi-winding integration capability, and is prone to the inter-winding leakage inductance to be difficult to accurately estimate. For the magnetic integration mode, the conventional high-voltage high-power multi-winding intermediate-frequency transformer adjusts the equivalent leakage inductance between the ports by adjusting an air gap of a main magnetic circuit, thereby improving the power transmission capability of a system, but an adjustable range of the equivalent leakage inductance is limited and the volume of the transformer will be significantly increased.

SUMMARY

The technical problems to be solved by the present disclosure are as follows. In response to the deficiencies in the prior art, the present disclosure provides a multi-port magnetic network energy router and a control method, multiple full-bridge converters can be effectively integrated and a power density of a system is improved, equivalent large leakage inductance can be magnetically integrated at each converter port, thereby realizing high-power energy routing at each port, and solving the problem that the high power density and the high-power energy routing characteristics of a conventional magnetic network energy router system cannot be achieved at the same time.

The present disclosure solves the above technical problems by the following technical solutions.

The present disclosure provides a multi-port magnetic network energy router, including a dual magnetic plate crimped N-winding transformer containing distributed magnetic core columns, and first to $N_{th}$ full-bridge converters, the dual magnetic plate crimped N-winding transformer including first to $N^{th}$ distributed magnetic core columns, first to $N^{th}$ power windings, first to second magnetic flux leakage core columns, and first to second magnetic plates, the first to $N^{th}$ power windings being tightly wound on the first to $N^{th}$ distributed magnetic core columns, upper ends of the first to $N^{th}$ distributed magnetic core columns and an upper end of a first magnetic flux leakage core column being connected to a first magnetic plate, and lower ends of the first to $N^{th}$ distributed magnetic core columns and a lower end of a second magnetic flux leakage core column being connected to a second magnetic plate.

The first to $N_{th}$ distributed magnetic core columns, the first to second magnetic flux leakage core columns, and the first to second magnetic plates are made of the same soft magnetic material. The first to $N_{th}$ distributed magnetic core columns have the same cross-sectional areas and lengths. The first to second magnetic flux leakage core columns have the same cross-sectional areas and lengths, a certain air gap being left between the first and second magnetic flux leakage core columns.

The magnetic network energy router has N ports, and each of the full-bridge converters includes first to fourth reverse conducting insulated gate bipolar transistors (RC-IGBTs), a DC capacitor, and a DC source. A collector electrode of a first RC-IGBT and a collector electrode of a third RC-IGBT are connected to the DC capacitor and a positive electrode of the DC source, respectively. An emitter electrode of a second RC-IGBT and an emitter electrode of a fourth RC-IGBT are connected to the DC capacitor and a negative electrode of the DC source, respectively. An emitter electrode of the first RC-IGBT is connected to a collector electrode of the second RC-IGBT, a connection point therebetween being connected to lower ends of the first to $N_{th}$ power windings. An emitter electrode of the third RC-IGBT is connected to a collector electrode of the fourth RC-IGBT, a connection point therebetween being connected to upper ends of the first to Nin power windings.

In view of the above structure, the present disclosure provides a control method applicable to a multi-port magnetic network energy router, including the following steps of:

S1. calculating equivalent connection inductance $L_{ij}$ of an $i_{th}$ full-bridge converter and of a $j_{th}$ full-bridge converter separately, i≠j;

S2. calculating steady-state control phase shift angles $\varphi_{1s}, \ldots, \varphi_{Ns}$ of the first to $N_{th}$ full-bridge converters respectively on the basis of reference powers of various DC sources in a magnetic network energy router;

S3. calculating a power decoupling control matrix H of the magnetic network energy router;

S4. calculating control phase shift angle micro-increments $\Delta\varphi_2, \ldots, \Delta\varphi_N$ of second to $N_{th}$ full-bridge converters respectively by a power closed-loop control; and S5. calculating control phase shift angles $\varphi_1, \ldots, \varphi_N$, and controlling the first to $N_{th}$ full-bridge converters to output square-wave voltages of fifty percent duty cycles with the phase shift angles being $\varphi_1, \ldots, \varphi_N$, and ultimately realizing the control of a given power of the magnetic network energy router.

The present disclosure further provides an electronic device, including a memory, a processor and a computer program stored in the memory and runnable on the processor, and when the processor executes the computer program, steps of a control method of the present disclosure are implemented.

Compared with the prior art, the present disclosure has the following beneficial effects by adopting the above technical solutions.

1. A multi-port magnetic network energy router structure provided in the present disclosure has superior multi-winding integration capability and power density than an EE-type magnetic core or UU-type magnetic core structure used in the conventional high-voltage high-power multi-winding intermediate-frequency transformer, solving the problem of low multi-winding integration capability and power density of EE-type magnetic core or UU-type magnetic core.

2. The multi-port magnetic network energy router structure provided in the present disclosure adjusts the equivalent leakage inductance between ports by adjusting the air gap between a pair of magnetic flux leakage core columns, and has a wider adjustable range of equivalent leakage inductance compared with the conventional high-voltage high-power multi-winding intermediate-frequency transformer that adjusts the equivalent leakage inductance between the ports by adjusting an air gap of a main magnetic circuit, and therefore the power transmission capability of a system is stronger without significantly increasing the volume of the transformer.

3. According to the control method applicable to a multi-port magnetic network energy router provided in the present disclosure, the control of the given power of the magnetic network energy router can be realized by controlling various full-bridge converters to output square-wave voltages of fifty percent duty cycles with different phase shift angles at different power transmission levels, and compared with a control method for the conventional magnetic network energy router, the control method has a wider range of application and stronger practicability.

BRIEF DESCRIPTION OF THE DRAWINGS

For illustrating the technical solutions of embodiments in the present disclosure or the prior art more clearly, the accompanying drawings needed in the embodiments or prior art are described briefly below. Obviously, for those ordinary skilled in the art, other drawings can be obtained according to these drawings without creative efforts.

DETAILED DESCRIPTION

The technical solutions of the embodiments in the present disclosure will be described clearly and completely by reference to the accompanying drawings of the embodiments in the present disclosure below. Obviously, the embodiments described are only some, rather than all embodiments of the present disclosure. On the basis of the embodiments of the present disclosure, all other embodiments obtained by those ordinary skilled in the art without creative efforts fall within the scope of protection of the present disclosure.

Embodiment 1 (Taking Three-Port as an Example)

Figure 1:
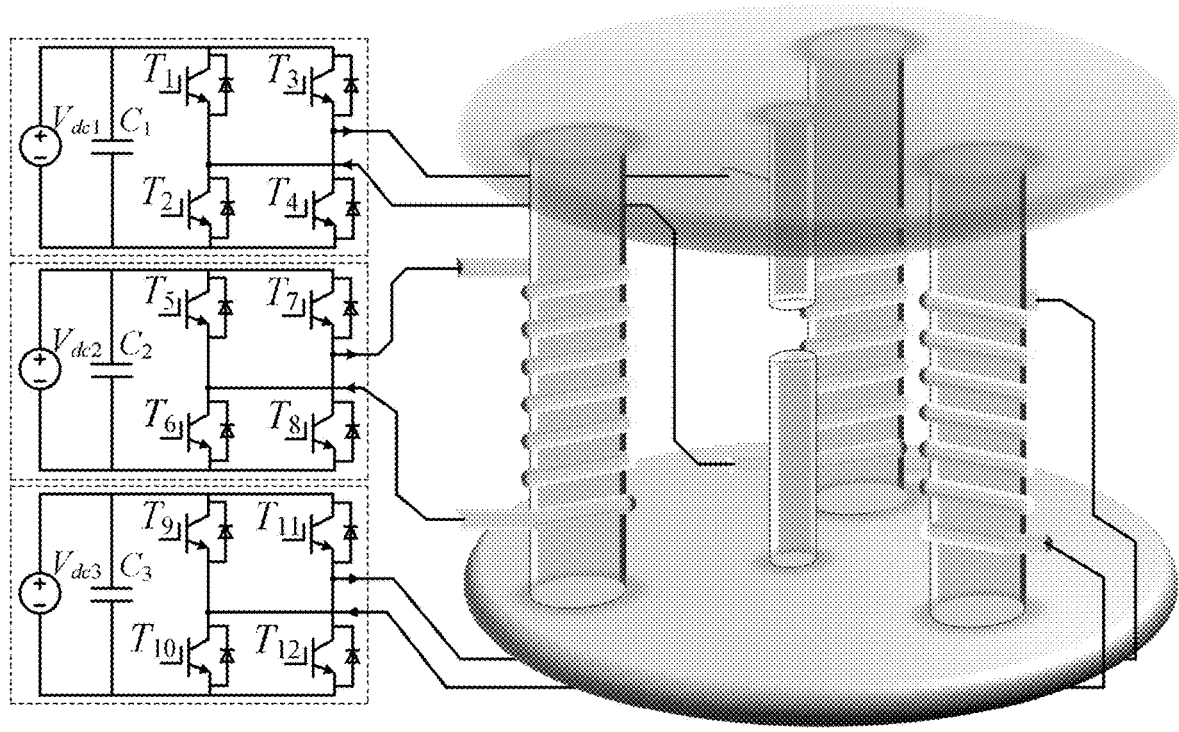
FIG. 1 is a schematic diagram of a magnetic network energy router structure with three ports as an example according to the present disclosure.

As shown in FIG. 1, the embodiment provides a three-port magnetic network energy router structure, including a dual magnetic plate crimped three-winding transformer containing distributed magnetic core columns, and first to third full-bridge converters. The dual magnetic plate crimped three-winding transformer containing distributed magnetic core columns includes first to third distributed magnetic core columns, first to third power windings, first to second magnetic flux leakage core columns, and first to second magnetic plates. The first to third power windings are tightly wound on the first to third distributed magnetic core columns. Upper ends of the first to third distributed magnetic core columns and an upper end of a first magnetic flux leakage core column are connected to a first magnetic plate. Lower ends of the first to third distributed magnetic core columns and a lower end of a second magnetic flux leakage core column are connected to a second magnetic plate.

The first to third distributed magnetic core columns, the first to second magnetic flux leakage core columns, and the first to second magnetic plates are made of the same soft magnetic material. The first to third distributed magnetic core columns have the same cross-sectional areas and lengths. The first to second magnetic flux leakage core columns have the same cross-sectional areas and lengths, a certain air gap being left between the first and second magnetic flux leakage core columns.

For the first to third full-bridge converters, each of the full-bridge converters includes first to fourth RC-IGBTs, a DC capacitor, and a DC source. A collector electrode of a first RC-IGBT and a collector electrode of a third RC-IGBT are connected to the DC capacitor and a positive electrode of the DC source, respectively. An emitter electrode of a second RC-IGBT and an emitter electrode of a fourth RC-IGBT are connected to the DC capacitor and a negative electrode of the DC source, respectively. An emitter electrode of the first RC-IGBT is connected to a collector electrode of the second RC-IGBT, a connection point therebetween being connected to lower ends of the first to third power windings. An emitter electrode of the third RC-IGBT is connected to a collector electrode of the fourth RC-IGBT, a connection point therebetween being connected to upper ends of the first to third power windings.

Figure 4:
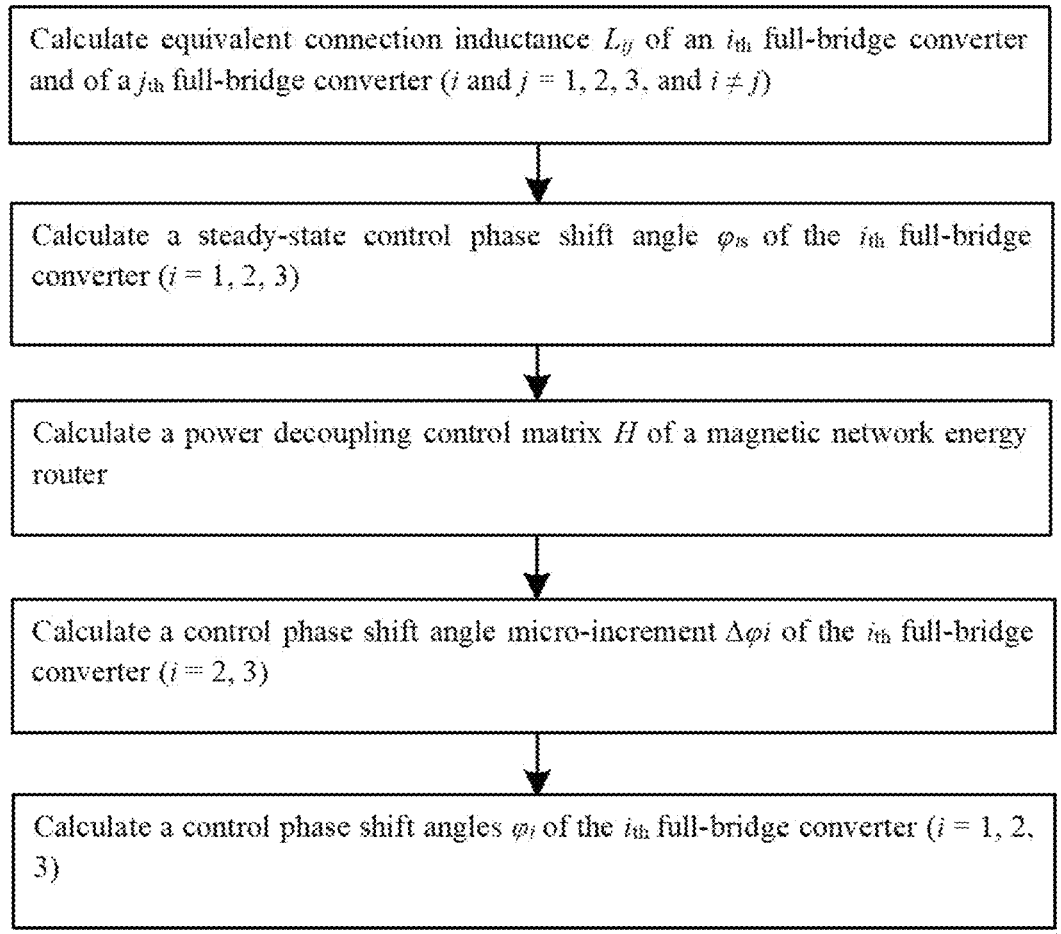
FIG. 4 is a flow chart of a control method applicable to a three-port magnetic network energy router according to the present disclosure.

As shown in FIG. 4, the embodiment provides a control method applicable to a three-port magnetic network energy router, including the following steps.

In S1, equivalent connection inductance $L_{ij}$ of an $i_{th}$ full-bridge converter and of a $j_{th}$ full-bridge converter is calculated, i=1, 2, 3, j=1, 2, 3, and i≠j.

In S2, steady-state control phase shift angles $\varphi_{1s}$, $\varphi_{2s}$ and $\varphi_{3s}$ of first to third full-bridge converters are calculated respectively on the basis of reference powers of various DC sources in a magnetic network energy router.

In S3, a power decoupling control matrix H of the magnetic network energy router is calculated.

In S4, control phase shift angle micro-increments $\Delta_{\varphi2}$ and $\Delta_{\varphi3}$ of second to third full-bridge converters are calculated respectively by a power closed-loop control.

In S5, control phase shift angles $\varphi_1$, $\varphi_2$ and $\varphi_3$ are calculated, the first to third full-bridge converters are controlled to output square-wave voltages of fifty percent duty cycles with the phase shift angles being $\varphi_1$, $\varphi_2$ and $\varphi_3$, and the control of a given power of the magnetic network energy router is realized ultimately.

The equivalent connection inductance $L_{ij}$ of the $i_{th}$ full-bridge converter and of the $j_{th}$ full-bridge converter in S1 is calculated by a formula as follows:

$$L_{ij} = -\frac{1}{Y_{ij}} \quad (1)$$

In Formula (1), $Y_{ij}$ represents an element in an $i_{th}$ row and $j_{th}$ column of an equivalent admittance matrix Y of the magnetic network energy router. Y is calculated by a formula as follows:

$$Y = \begin{bmatrix} Y_{11} & Y_{12} & Y_{13} \\ Y_{21} & Y_{22} & Y_{23} \\ Y_{31} & Y_{32} & Y_{33} \end{bmatrix} = \begin{bmatrix} L_1 & k_{12}\sqrt{L_1 L_2} & k_{13}\sqrt{L_1 L_3} \\ k_{21}\sqrt{L_1 L_2} & L_2 & k_{23}\sqrt{L_2 L_3} \\ k_{31}\sqrt{L_1 L_3} & k_{32}\sqrt{L_2 L_3} & L_3 \end{bmatrix}^{-1} \quad (2)$$

In Formula (2), $L_1$, $L_2$ and $L_3$ represent open circuit inductance of first to third power windings, respectively, which can be experimentally measured, and $k_{ij}$ represents a coupling coefficient between an $i_{th}$ power winding and a $j_{th}$ power winding in the magnetic network energy router, which can be adjusted by changing a cross-sectional area and width of an air gap between first and second magnetic flux leakage core columns and can be experimentally measured.

The steady-state control phase shift angles $\varphi_{1s}$, $\varphi_{2s}$ and $\varphi_{3s}$ in S2 are calculated by a formula as follows:

$$\begin{cases} \varphi_{1S} = 0; \\ \varphi_{is} = f^{-1}\left[P_i^* = P_i = \sum_{j=1,2,\ldots,N}^{j \neq i} \frac{V_{dci} V_{dcj}}{2\pi f_s L_{ij}} (\varphi_{is} - \varphi_{js})\left(1 - \frac{|\varphi_{is} - \varphi_{js}|}{\pi}\right)\right], \\ i = 2, 3 \end{cases} \quad (3)$$

In Formula (3), $P_i^*$ represents a reference power of an $i_{th}$ DC source; $P_i$ represents an average power of the $i_{th}$ DC source; $f_s$ represents switching frequencies of the first to third full-bridge converters; and $V_{dci}$ and $V_{dcj}$ represent a voltage of the $i_{th}$ DC source and a voltage of a $j_{th}$ DC source, respectively.

The power decoupling control matrix H of the magnetic network energy router in S3 is calculated by a formula as follows:

$$H = \frac{1}{2\pi f_s} \begin{pmatrix} \sum_{j=1,3} \frac{V_{dcj}}{L_{2j}}\left(1 - \frac{2}{\pi}|\varphi_{2s} - \varphi_{js}|\right) & -\frac{V_{dc3}}{L_{23}}\left(1 - \frac{2}{\pi}|\varphi_{2s} - \varphi_{3s}|\right) \\ -\frac{V_{dc2}}{L_{23}}\left(1 - \frac{2}{\pi}|\varphi_{2s} - \varphi_{3s}|\right) & \sum_{j=1,2} \frac{V_{dcj}}{L_{3j}}\left(1 - \frac{2}{\pi}|\varphi_{3s} - \varphi_{js}|\right) \end{pmatrix}^{-1} \quad (4)$$

where $\varphi_{2s}$ and $\varphi_{3s}$ represent steady-state control phase shift angles of the second to third full-bridge converters, respectively.

The control phase shift angle micro-increments $\Delta\varphi_2$ and $\Delta\varphi_3$ being calculated by the power closed-loop control in S4 includes the following steps.

In R1: a DC source with a constant voltage and without power control requirements is taken as a first DC source.

In R2: real-time sampling is performed and the average power $P_i$ of the $i_{th}$ DC source is calculated; $P_i$ is compared with the reference power $P_i^*$ of the $i_{th}$ DC source for a difference; and $\Delta\varphi_2$ and $\Delta\varphi_3$ are determined by a proportional-integral controller. $\Delta\varphi_2$ and $\Delta\varphi_3$ are calculated by a formula as follows:

$$\Delta\varphi_i = K_p(P_i^* - P_i) + K_i \int (P_i^* - P_i) dt, i=2,3 \quad (5)$$

In Formula (5), $K_p$ represents a proportionality coefficient of the power closed-loop control, and $K_i$ represents an integral coefficient of the power closed-loop control.

The control phase shift angles $\varphi_1$, $\varphi_2$ and $\varphi_3$ in S5 are calculated by a formula as follows:

$$\begin{cases} \varphi_1 = \varphi_{1s} = 0; \\ \begin{bmatrix} \varphi_2 \\ \varphi_3 \end{bmatrix} = \begin{bmatrix} \varphi_{2s} \\ \varphi_{3s} \end{bmatrix} + H \begin{bmatrix} \Delta\varphi_2 \\ \Delta\varphi_3 \end{bmatrix} \end{cases} \quad (6)$$

where $\varphi_1$, $\varphi_2$ and $\varphi_3$ represent phase shift angles outputted by the first to third full-bridge converters, respectively.

Embodiment 2 (Taking Four-Port as an Example)

Figure 2:
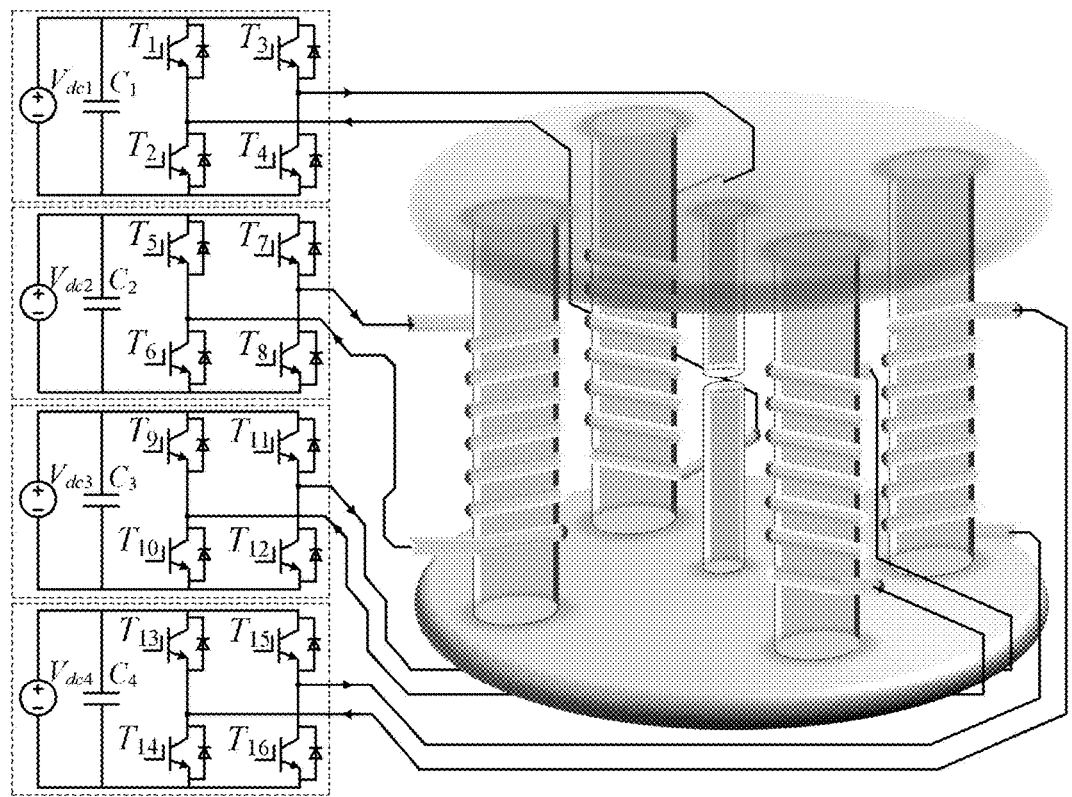
FIG. 2 is a schematic diagram of a magnetic network energy router structure with four ports as an example according to the present disclosure.

As shown in FIG. 2, the embodiment provides a four-port magnetic network energy router structure, including a dual magnetic plate crimped four-winding transformer containing distributed magnetic core columns, and first to fourth full-bridge converters. The dual magnetic plate crimped four-winding transformer containing distributed magnetic core columns includes first to fourth distributed magnetic core columns, first to fourth power windings, first to second magnetic flux leakage core columns, and first to second magnetic plates. The first to fourth power windings are tightly wound on the first to fourth distributed magnetic core columns. Upper ends of the first to fourth distributed magnetic core columns and an upper end of a first magnetic flux leakage core column are connected to a first magnetic plate. Lower ends of the first to fourth distributed magnetic core columns and a lower end of a second magnetic flux leakage core column are connected to a second magnetic plate.

The first to fourth distributed magnetic core columns, the first to second magnetic flux leakage core columns, and the first to second magnetic plates are made of the same soft magnetic material. The first to fourth distributed magnetic core columns have the same cross-sectional areas and lengths. The first to second magnetic flux leakage core columns have the same cross-sectional areas and lengths, a certain air gap being left between the first and second magnetic flux leakage core columns.

For the first to fourth full-bridge converters, each of the full-bridge converters includes first to fourth RC-IGBTs, a DC capacitor, and a DC source. A collector electrode of a first RC-IGBT and a collector electrode of a third RC-IGBT are connected to the DC capacitor and a positive electrode of the DC source, respectively. An emitter electrode of a second RC-IGBT and an emitter electrode of a fourth RC-IGBT are connected to the DC capacitor and a negative electrode of the DC source, respectively. An emitter electrode of the first RC-IGBT is connected to a collector electrode of the second RC-IGBT, a connection point therebetween being connected to lower ends of the first to fourth power windings. An emitter electrode of the third RC-IGBT is connected to a collector electrode of the fourth RC-IGBT, a connection point therebetween being connected to upper ends of the first to fourth power windings.

Figure 5:
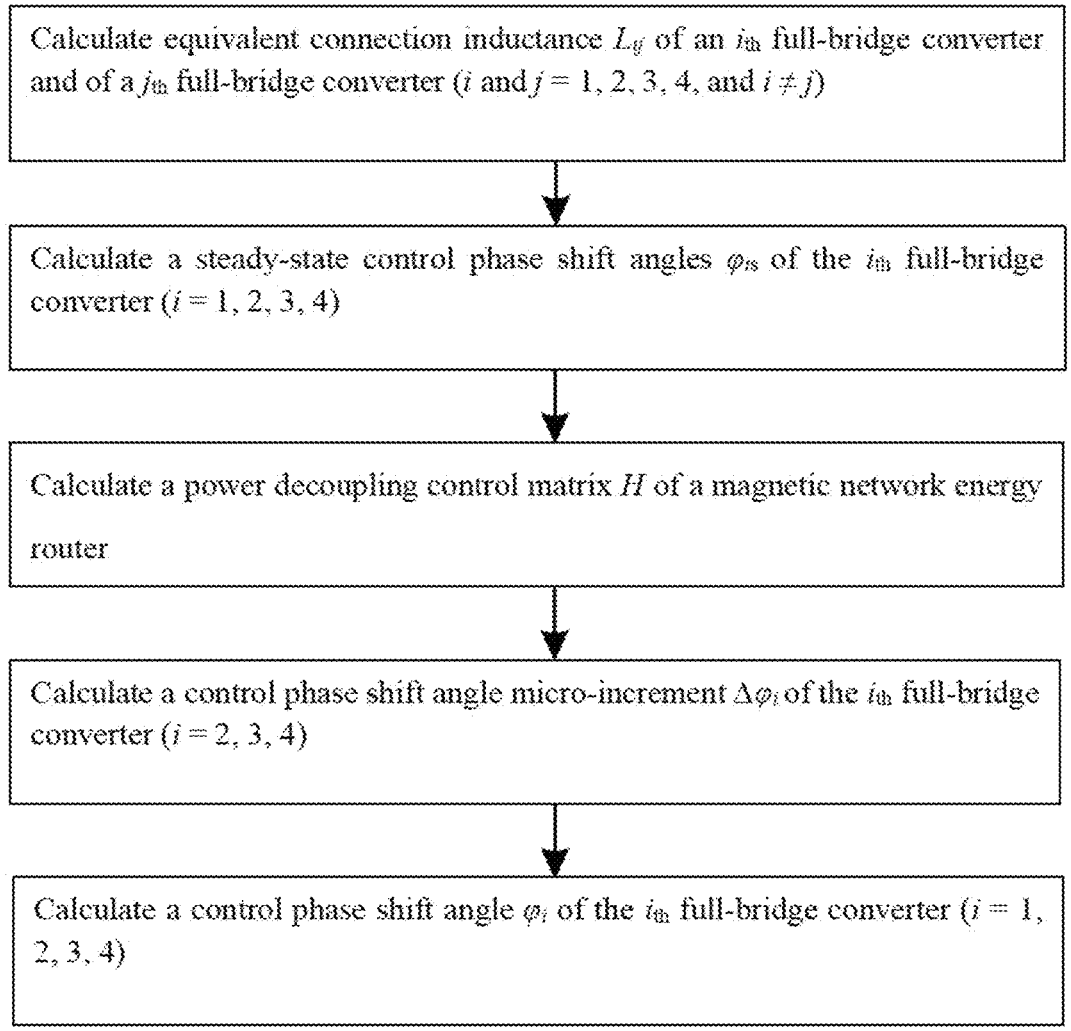
FIG. 5 is a flow chart of a control method applicable to a four-port magnetic network energy router according to the present disclosure.

As shown in FIG. 5, the embodiment provides a control method applicable to a four-port magnetic network energy router, including the following steps.

In S1, equivalent connection inductance $L_{ij}$ of an $i_{th}$ full-bridge converter and of a $j_{th}$ full-bridge converter is calculated, i=1, 2, 3, 4, j=1, 2, 3, 4, and i≠j.

In S2, steady-state control phase shift angles $\varphi_{1s}$, $\varphi_{2s}$, $\varphi_{3s}$ and $\varphi_{4s}$ of first to fourth full-bridge converters are calculated respectively on the basis of reference powers of various DC sources in a magnetic network energy router.

In S3, a power decoupling control matrix H of the magnetic network energy router is calculated.

In S4, control phase shift angle micro-increments $\Delta\varphi_2$, $\Delta\varphi_3$ and $\Delta\varphi_4$ of second to fourth full-bridge converters are calculated respectively by a power closed-loop control.

In S5, control phase shift angles $\varphi_1$, $\varphi_2$, $\varphi_3$ and $\varphi_4$ are calculated, and the first to fourth full-bridge converters are controlled to output square-wave voltages of fifty percent duty cycles with the phase shift angles being $\varphi_1$, $\varphi_2$, $\varphi_3$ and $\varphi_4$, and the control of a given power of the magnetic network energy router is realized ultimately.

The equivalent connection inductance $L_{ij}$ of the $i_{th}$ full-bridge converter and of the $j_{th}$ full-bridge converter in S1 is calculated by a formula as follows:

$$L_{ij} = -\frac{1}{Y_{ij}} \quad (1)$$

In Formula (1), $Y_{ij}$ represents an element in an $i_{th}$ row and $j_{th}$ column of an equivalent admittance matrix Y of the magnetic network energy router. Y is calculated by a formula as follows:

$$Y = \begin{bmatrix} Y_{11} & Y_{12} & Y_{13} & Y_{14} \\ Y_{21} & Y_{22} & Y_{23} & Y_{24} \\ Y_{31} & Y_{32} & Y_{33} & Y_{34} \\ Y_{41} & Y_{42} & Y_{43} & Y_{44} \end{bmatrix} = \quad (7)$$

$$\begin{bmatrix} L_1 & k_{12}\sqrt{L_1 L_2} & k_{13}\sqrt{L_1 L_3} & k_{14}\sqrt{L_1 L_4} \\ k_{21}\sqrt{L_1 L_2} & L_2 & k_{23}\sqrt{L_2 L_3} & k_{24}\sqrt{L_2 L_4} \\ k_{31}\sqrt{L_1 L_3} & k_{32}\sqrt{L_2 L_3} & L_3 & k_{34}\sqrt{L_3 L_4} \\ k_{41}\sqrt{L_1 L_4} & k_{42}\sqrt{L_2 L_4} & k_{43}\sqrt{L_3 L_4} & L_4 \end{bmatrix}^{-1}$$

In Formula (7), $L_1$, $L_2$, $L_3$ and $L_4$ represent open circuit inductance of first to fourth power windings, respectively, which can be experimentally measured, and $k_{ij}$ represents a coupling coefficient between an $i_{th}$ power winding and a $j_{th}$ power winding in the magnetic network energy router, which can be adjusted by changing a cross-sectional area and width of an air gap between first and second magnetic flux leakage core columns and can be experimentally measured.

The steady-state control phase shift angles $\varphi_{1s}$, $\varphi_{2s}$, $\varphi_{3s}$ and $\varphi_{4s}$ in S2 are calculated by a formula as follows:

$$\begin{cases} \varphi_{1s} = 0; \\ \varphi_{is} = f^{-1}\left[P_i^* = P_i = \sum_{j=1,2,\ldots,N}^{j\neq i} \frac{V_{dci}V_{dcj}}{2\pi f_s L_{ij}}(\varphi_{is} - \varphi_{js})\left(1 - \frac{|\varphi_{is} - \varphi_{is}|}{\pi}\right)\right], \\ i = 2, 3, 4 \end{cases} \quad (8)$$

In Formula (8), $P_i^*$ represents a reference power of an $i_{th}$ DC source; $P_i$ represents an average power of the $i_{th}$ DC source; $f_s$ represents switching frequencies of the first to fourth full-bridge converters; and $V_{dci}$ and $V_{dcj}$ represent a voltage of the $i_{th}$ DC source and a voltage of a $j_{th}$ DC source, respectively.

The power decoupling control matrix H of the magnetic network energy router in S3 is calculated by a formula as follows:

(9)

$$H = \left[\frac{1}{2\pi f_s}\begin{pmatrix} \sum_{j=1,3,4}\frac{V_{dcj}}{L_{2j}}\left(1 - \frac{2}{\pi}|\varphi_{2s} - \varphi_{js}|\right) & -\frac{V_{dc3}}{L_{23}}\left(1 - \frac{2}{\pi}|\varphi_{2s} - \varphi_{3s}|\right) & -\frac{V_{dc4}}{L_{24}}\left(1 - \frac{2}{\pi}|\varphi_{2s} - \varphi_{4s}|\right) \\ -\frac{V_{dc2}}{L_{23}}\left(1 - \frac{2}{\pi}|\varphi_{2s} - \varphi_{3s}|\right) & \sum_{j=1,2,4}\frac{V_{dcj}}{L_{3j}}\left(1 - \frac{2}{\pi}|\varphi_{3s} - \varphi_{js}|\right) & -\frac{V_{dc4}}{L_{34}}\left(1 - \frac{2}{\pi}|\varphi_{3s} - \varphi_{4s}|\right) \\ -\frac{V_{dc2}}{L_{24}}\left(1 - \frac{2}{\pi}|\varphi_{2s} - \varphi_{4s}|\right) & -\frac{V_{dc3}}{L_{34}}\left(1 - \frac{2}{\pi}|\varphi_{3s} - \varphi_{4s}|\right) & \sum_{j=1,2,3}\frac{V_{dcj}}{L_{4j}}\left(1 - \frac{2}{\pi}|\varphi_{4s} - \varphi_{js}|\right) \end{pmatrix}\right]^{-1}$$

where $\varphi_{1s}$, $\varphi_{2s}$, $\varphi_{3s}$ and $\varphi_{4s}$ represent steady-state control phase shift angles of the second to fourth full-bridge converters, respectively.

The control phase shift angle micro-increments $\Delta\varphi_2$, $\Delta\varphi_3$ and $\Delta\varphi_4$ being calculated by the power closed-loop control in S4 includes the following steps.

In R1: a DC source with a constant voltage and without power control requirements is taken as a first DC source.

In R2: real-time sampling is performed and the average power $P_i$ of the $i_{th}$ DC source is calculated; $P_i$ is compared with the reference power $P_i^*$ of the it DC source for a difference; and $\Delta\varphi_2$, $\Delta\varphi_3$ and $\Delta\varphi_4$ are determined by a proportional-integral controller. $\Delta\varphi_2$, $\Delta\varphi_3$ and $\Delta\varphi_4$ are calculated by a formula as follows:

$$\Delta\varphi_i = K_p(P_i^* - P_i) + K_i \int (P_i^* - P_i)dt, i=2,3,4 \qquad (10)$$

In Formula (10), $K_p$ represents a proportionality coefficient of the power closed-loop control, and $K_i$ represents an integral coefficient of the power closed-loop control.

The control phase shift angles $\varphi_1$, $\varphi_2$, $\varphi_3$ and $\varphi_4$ in S5 are calculated by a formula as follows:

$$\begin{cases} \varphi_1 = \varphi_{1s} = 0; \\ \begin{bmatrix} \varphi_2 \\ \varphi_3 \\ \varphi_4 \end{bmatrix} = \begin{bmatrix} \varphi_{2s} \\ \varphi_{3s} \\ \varphi_{4s} \end{bmatrix} + H \begin{bmatrix} \Delta\varphi_2 \\ \Delta\varphi_3 \\ \Delta\varphi_4 \end{bmatrix} \end{cases} \qquad (11)$$

where $\varphi_1$, $\varphi_2$, $\varphi_3$ and $\varphi_4$ represent phase shift angles outputted by the first to fourth full-bridge converters, respectively.

Embodiment 3 (Taking Six-Port as an Example)

Figure 3:
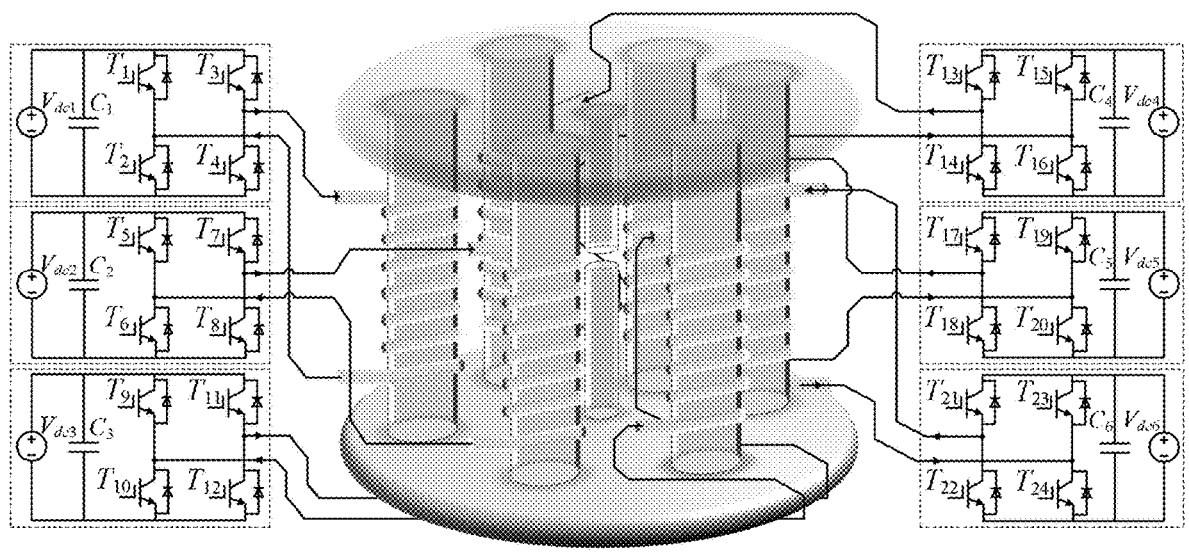
FIG. 3 is a schematic diagram of a magnetic network energy router structure with six ports as an example according to the present disclosure.

As shown in FIG. 3, the embodiment provides a six-port magnetic network energy router structure, including a dual magnetic plate crimped six-winding transformer containing distributed magnetic core columns, and first to sixth full-bridge converters. The dual magnetic plate crimped six-winding transformer containing distributed magnetic core columns includes first to sixth distributed magnetic core columns, first to sixth power windings, first to second magnetic flux leakage core columns, and first to second magnetic plates. The first to sixth power windings are tightly wound on the first to sixth distributed magnetic core columns. Upper ends of the first to sixth distributed magnetic core columns and an upper end of a first magnetic flux leakage core column are connected to a first magnetic plate. Lower ends of the first to sixth distributed magnetic core columns and a lower end of a second magnetic flux leakage core column are connected to a second magnetic plate.

The first to sixth distributed magnetic core columns, the first to second magnetic flux leakage core columns, and the first to second magnetic plates are made of the same soft magnetic material. The first to sixth distributed magnetic core columns have the same cross-sectional areas and lengths. The first to second magnetic flux leakage core columns have the same cross-sectional areas and lengths, a certain air gap being left between the first and second magnetic flux leakage core columns.

Each of the full-bridge converters includes first to fourth RC-IGBTs, a DC capacitor, and a DC source. A collector electrode of a first RC-IGBT and a collector electrode of a third RC-IGBT are connected to the DC capacitor and a positive electrode of the DC source, respectively. An emitter electrode of a second RC-IGBT and an emitter electrode of a fourth RC-IGBT are connected to the DC capacitor and a negative electrode of the DC source, respectively. An emitter electrode of the first RC-IGBT is connected to a collector electrode of the second RC-IGBT, a connection point therebetween being connected to lower ends of the first to sixth power windings. An emitter electrode of the third RC-IGBT is connected to a collector electrode of the fourth RC-IGBT, a connection point therebetween being connected to upper ends of the first to sixth power windings.

Figure 6:
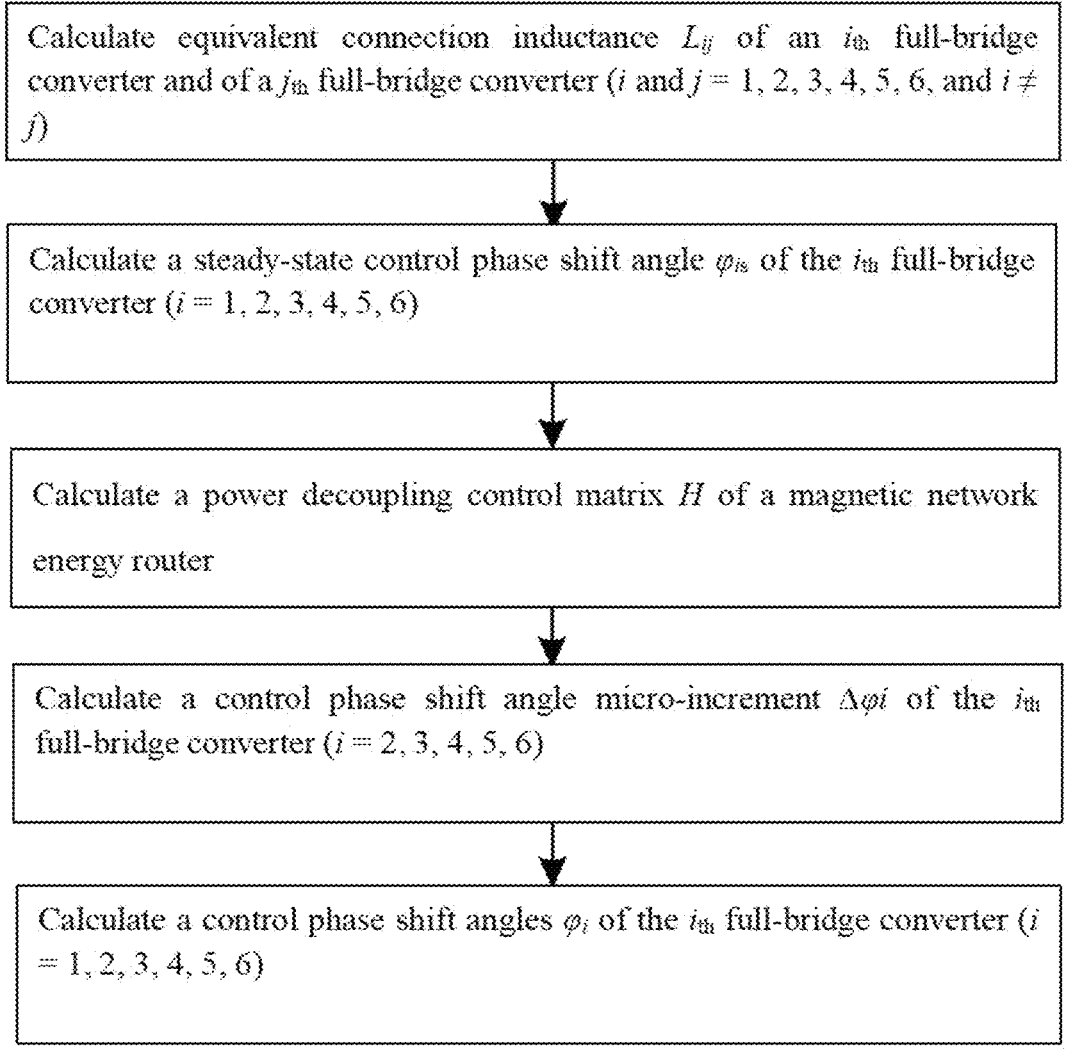
FIG. 6 is a flow chart of a control method applicable to a six-port magnetic network energy router according to the present disclosure.

As shown in FIG. 6, the embodiment provides a control method applicable to a six-port magnetic network energy router, including the following steps.

In S1, equivalent connection inductance $L_{ij}$ of an $i_{th}$ full-bridge converter and of a $j_{th}$ full-bridge converter is calculated, i=1, 2, 3, 4, 5, 6, j=1, 2, 3, 4, 5, 6, and i≠j.

In S2, steady-state control phase shift angles $\varphi_{1s}$, $\varphi_{2s}$, $\varphi_{3s}$, $\varphi_{4s}$, $\varphi_{5s}$ and $\varphi_{6s}$ of the first to sixth full-bridge converters are calculated respectively on the basis of reference powers of various DC sources in a magnetic network energy router.

In S3, a power decoupling control matrix H of the magnetic network energy router is calculated.

In S4, control phase shift angle micro-increments $\Delta\varphi_2$, $\Delta\varphi_3$, $\Delta\varphi_4$, $\Delta\varphi_5$ and $\Delta\varphi_6$ of second to sixth full-bridge converters are calculated respectively by a power closed-loop control.

In S5, control phase shift angles $\varphi_1$, $\varphi_2$, $\varphi_3$, $\varphi_4$, $\varphi_5$ and $\varphi_6$ are calculated, and the first to sixth full-bridge converters are controlled to output square-wave voltages of fifty percent duty cycles with the phase shift angles being $\varphi_1$, $\varphi_2$, $\varphi_3$, $\varphi_4$, $\varphi_5$ and $\varphi_6$, and the control of a given power of the magnetic network energy router is realized ultimately.

The equivalent connection inductance $L_{ij}$ of the $i_{th}$ full-bridge converter and of the $j_{th}$ full-bridge converter in S1 is calculated by a formula as follows:

$$L_{ij} = -\frac{1}{Y_{ij}} \qquad (1)$$

In Formula (1), $Y_{ij}$ represents an element in an $i_{th}$ row and $j_{th}$ column of an equivalent admittance matrix Y of the magnetic network energy router. Y is calculated by a formula as follows:

$$Y = \begin{bmatrix} Y_{11} & Y_{12} & Y_{13} & Y_{14} & Y_{15} & Y_{16} \\ Y_{21} & Y_{22} & Y_{23} & Y_{24} & Y_{25} & Y_{26} \\ Y_{31} & Y_{32} & Y_{33} & Y_{34} & Y_{35} & Y_{36} \\ Y_{41} & Y_{42} & Y_{43} & Y_{44} & Y_{45} & Y_{46} \\ Y_{51} & Y_{52} & Y_{53} & Y_{54} & Y_{55} & Y_{56} \\ Y_{61} & Y_{62} & Y_{63} & Y_{64} & Y_{65} & Y_{66} \end{bmatrix} = \qquad (12)$$

-continued $$\begin{bmatrix} L_1 & k_{12}\sqrt{L_1L_2} & k_{13}\sqrt{L_1L_3} & k_{14}\sqrt{L_1L_4} & k_{15}\sqrt{L_1L_5} & k_{16}\sqrt{L_1L_6} \\ k_{21}\sqrt{L_1L_2} & L_2 & k_{23}\sqrt{L_2L_3} & k_{24}\sqrt{L_2L_4} & k_{25}\sqrt{L_2L_5} & k_{26}\sqrt{L_2L_6} \\ k_{31}\sqrt{L_1L_3} & k_{32}\sqrt{L_2L_3} & L_3 & k_{34}\sqrt{L_3L_4} & k_{35}\sqrt{L_3L_5} & k_{36}\sqrt{L_3L_6} \\ k_{41}\sqrt{L_1L_4} & k_{42}\sqrt{L_2L_4} & k_{43}\sqrt{L_3L_4} & L_4 & k_{45}\sqrt{L_4L_5} & k_{46}\sqrt{L_4L_6} \\ k_{51}\sqrt{L_1L_5} & k_{52}\sqrt{L_2L_5} & k_{53}\sqrt{L_3L_5} & k_{54}\sqrt{L_4L_5} & L_5 & k_{56}\sqrt{L_5L_6} \\ k_{61}\sqrt{L_1L_6} & k_{62}\sqrt{L_2L_6} & k_{63}\sqrt{L_3L_6} & k_{64}\sqrt{L_4L_6} & k_{65}\sqrt{L_5L_6} & L_6 \end{bmatrix}^{-1}$$

In Formula (12), $L_1$, $L_2$, $L_3$, $L_4$, $L_5$ and $L_6$ represent open circuit inductance of first to sixth power windings, respectively, which can be experimentally measured; and $k_{ij}$ represents a coupling coefficient between an $i_{th}$ power winding and a $j_{th}$ power winding in the magnetic network energy router, which can be adjusted by changing a cross-sectional area and width of an air gap between first and second magnetic flux leakage core columns and can be experimentally measured.

The steady-state control phase shift angles $\varphi_{1s}$, $\varphi_{2s}$, $\varphi_{3s}$, $\varphi_{4s}$, $\varphi_{5s}$ and $\varphi_{6s}$ in S2 are calculated by a formula as follows:

$$\begin{cases} \varphi_{1s} = 0; \\ \varphi_{is} = f^{-1}\left[P_i^* = P_i = \sum_{j=1,2,\ldots,N}^{j\neq i} \frac{V_{dci}V_{dq}}{2\pi f_s L_{ij}}(\varphi_{is} - \varphi_{is})\left(1 - \frac{|\varphi_{is} - \varphi_{is}|}{\pi}\right)\right], \\ i = 2,3,4,5,6 \end{cases} \quad (13)$$

In Formula (13), $P_i^*$ represents a reference power of an $i_{th}$ DC source; $P_i$ represents an average power of the $i_{th}$ DC source; $f_s$ represents switching frequencies of the first to fourth full-bridge converters; and $V_{dci}$ and $V_{dcj}$ represent a voltage of the $i_{th}$ DC source and a voltage of a $j_{th}$ DC source, respectively.

The power decoupling control matrix H of the magnetic network energy router in S3 is calculated by a formula as follows:

$$H = \begin{bmatrix} H_{11} & H_{12} & H_{13} & H_{14} & H_{15} \\ H_{21} & H_{22} & H_{23} & H_{24} & H_{25} \\ H_{31} & H_{32} & H_{33} & H_{34} & H_{35} \\ H_{41} & H_{42} & H_{43} & H_{44} & H_{45} \\ H_{51} & H_{52} & H_{53} & H_{54} & H_{55} \end{bmatrix}^{-1} \quad (14)$$

where $$\begin{cases} H_{ii} = \frac{1}{2\pi f_s} \sum_{j=1,2,3,4,5,6,j\neq i+1} \frac{V_{dcj}}{L_{(i+1)j}}\left(1 - \frac{2}{\pi}|\varphi_{(i+1)s} - \varphi_{is}|\right), i = 1,2,3,4,5 \\ H_{2j} = -\frac{1}{2\pi f_s}\frac{V_{dc(j+1)}}{L_{3(j+1)}}\left(1 - \frac{2}{\pi}|\varphi_{3s} - \varphi_{(j+1)s}|\right), j = 1,3,4,5 \\ H_{3j} = -\frac{1}{2\pi f_s}\frac{V_{dc(j+1)}}{L_{4(j+1)}}\left(1 - \frac{2}{\pi}|\varphi_{4s} - \varphi_{(j+1)s}|\right), j = 1,2,4,5 \\ H_{4j} = -\frac{1}{2\pi f_s}\frac{V_{dc(j+1)}}{L_{5(j+1)}}\left(1 - \frac{2}{\pi}|\varphi_{5s} - \varphi_{(j+1)s}|\right), j = 1,2,3,5 \\ H_{5j} = -\frac{1}{2\pi f_s}\frac{V_{dc(j+1)}}{L_{6(j+1)}}\left(1 - \frac{2}{\pi}|\varphi_{6s} - \varphi_{(j+1)s}|\right), j = 1,2,3,4 \end{cases} \quad (15)$$

where $\varphi_{1s}$, $\varphi_{2s}$, $\varphi_{3s}$, $\varphi_{4s}$, $\varphi_{5s}$, and $\varphi_{6s}$ represent steady-state control phase shift angles of the second to sixth full-bridge converters, respectively.

The control phase shift angle micro-increments $\Delta\varphi_2$, $\Delta\varphi_3$, $\Delta\varphi_4$, $\Delta\varphi_5$ and $\Delta\varphi_6$ being calculated by the power closed-loop control in S4 includes the following steps.

In R1: a DC source with a constant voltage and without power control requirements is taken as a first DC source.

In R2: real-time sampling is performed and the average power $P_i$ of the $i_{th}$ DC source is calculated; $P_i$ is compared with the reference power $P_i^*$ of the $i_{th}$ DC source for a difference; and $\Delta\varphi_2$, $\Delta\varphi_3$, $\Delta\varphi_4$, $\Delta\varphi_5$ and $\Delta\varphi_6$ are determined by a proportional-integral controller. $\Delta\varphi_2$, $\Delta\varphi_3$, $\Delta\varphi_4$, $\Delta\varphi_5$ and $\Delta\varphi_6$ are calculated by a formula as follows:

$$\Delta\varphi_i = K_p(P_i^* - P_i) + K_i\int(P_i^* - P_i)dt, i=2,3,4,5,6 \quad (16)$$

In Formula (16), $K_p$ represents a proportionality coefficient of the power closed-loop control, and $K_i$ represents an integral coefficient of the power closed-loop control.

The control phase shift angles $\varphi_1$, $\varphi_2$, $\varphi_3$, $\varphi_4$, $\varphi_5$ and $\varphi_6$ in S5 are calculated by a formula as follows:

$$\begin{cases} \varphi_1 = \varphi_{1s} = 0; \\ \begin{bmatrix} \varphi_2 \\ \varphi_3 \\ \varphi_4 \\ \varphi_5 \\ \varphi_6 \end{bmatrix} = \begin{bmatrix} \varphi_{2s} \\ \varphi_{3s} \\ \varphi_{4s} \\ \varphi_{5s} \\ \varphi_{6s} \end{bmatrix} + H\begin{bmatrix} \Delta\varphi_2 \\ \Delta\varphi_3 \\ \Delta\varphi_4 \\ \Delta\varphi_5 \\ \Delta\varphi_6 \end{bmatrix} \end{cases} \quad (17)$$

where $\varphi_1$, $\varphi_2$, $\varphi_3$, $\varphi_4$, $\varphi_5$ and $\varphi_6$ represent phase shift angles outputted by the first to sixth full-bridge converters, respectively.

An embodiment of the present disclosure further provides an electronic device, including a memory, a processor and a computer program stored in the memory and runnable on the processor. It is to be noted that each module in the above system corresponds to a specific step of the methods provided in the embodiments of the present disclosure, and is equipped with functional modules and beneficial effects corresponding to the execution of the methods. Technical details not described in detail in the embodiments may be found in the methods provided by the embodiments of the present disclosure.

Program codes for implementing the methods of the present application may be written in any combination of one or more programming languages. Those program codes may be provided to a processor or controller of a general-purpose computer, special-purpose computer, or other programmable data processing devices, such that when the program codes are executed by the processor or controller, functions/operations specified in a flow chart and/or block diagram are implemented. The program codes may be entirely or partially executed on a machine, partially executed on the machine as a stand-alone package and partially executed on a remote machine, or entirely executed on the remote machine or a server.

Herein, a machine-readable medium may be a tangible medium that may contain or store a program for use by or in conjunction with an instruction execution system, device, or apparatus. The machine-readable medium may be a machine-readable signal medium or a machine-readable storage medium. The machine-readable medium may include, but is not limited to, electronic, magnetic, optical, electromagnetic, infrared, or semiconductor systems, devices, or apparatus, or any suitable combination of the foregoing. More specific examples for a machine-readable storage medium would include electrical connections based on one or more wires, portable computer disks, hard disks, random access memory (RAM), read-only memories (ROM), erasable programmable read-only memories (EPROMs or flash memories), optical fibers, portable compact disk read-only memories (CD-ROMs), optical storage devices, magnetic storage devices, or any suitable combination of the foregoing.

The description of reference terms "an embodiment" "an example" "a specific example" throughout the specification means that a particular feature, structure, material, or characteristic described in connection with the embodiment or example is included in at least one embodiment or example of the present disclosure. In the specification, an indicative expression of the above terms not necessarily refers to the same embodiment or example. Furthermore, the particular feature, structure, material, or characteristic described may be combined in any suitable manner in any one or more embodiments or examples.

The above shows and describes the basic principles, main features and advantages of the present disclosure. Those skilled in the art are to be understood that the present disclosure is not limited by the above embodiments. The embodiments and specification described above are only to: describe the principle of the present disclosure. Various variations and improvements can be made without departing from the spirit and scope of the present disclosure, and all the variations and improvements fall within the protection scope claimed by the present disclosure.

The invention claimed is:

1. A control method for a multi-port magnetic network energy router, the multi-port magnetic network energy router comprising a dual magnetic plate crimped N-winding transformer containing distributed magnetic core columns, and first to $N_{th}$ full-bridge converters, the dual magnetic plate crimped N-winding transformer comprising first to $N_{th}$ distributed magnetic core columns, first to $N_{th}$ power windings, first to second magnetic flux leakage core columns, and first to second magnetic plates, the first to $N_{th}$ power windings being tightly wound on the first to $N_{th}$ distributed magnetic core columns, upper ends of the first to $N_{th}$ distributed magnetic core columns and an upper end of a first magnetic flux leakage core column being connected to a first magnetic plate, and lower ends of the first to $N_{th}$ distributed magnetic core columns and a lower end of a second magnetic flux leakage core column being connected to a second magnetic plate; and the control method comprising the following steps of:
S1. calculating equivalent connection inductance $L_{ij}$ of an $i_{th}$ full-bridge converter and of a $j_{th}$ full-bridge converter separately, i=1, 2, ..., N, j=1, 2, ..., N, and i≠j,
S2. calculating steady-state control phase shift angles $\varphi_{1s}, \ldots, \varphi_{Ns}$ of the first to $N_{th}$ full-bridge converters respectively on the basis of reference powers of various direct current (DC) sources in a magnetic network energy router,
S3. calculating a power decoupling control matrix H of the magnetic network energy router,
S4. calculating control phase shift angle micro-increments $\Delta\varphi_2, \ldots, \Delta\varphi_N$ of second to $N_{th}$ full-bridge converters respectively by a power closed-loop control, and
S5. calculating control phase shift angles $\varphi_1, \ldots, \varphi_N$, and controlling the first to $N_{th}$ full-bridge converters to output square-wave voltages of fifty percent duty cycles with the phase shift angles being $\varphi_1, \ldots, \varphi_N$, and ultimately realizing the control of a given power of the magnetic network energy router, wherein
the steady-state control phase shift angles $\varphi_{1s}, \ldots, \varphi_{Ns}$ in S2 are calculated by a formula as follows:

$$\begin{cases} \varphi_{1s} = 0; \\ \varphi_{is} = f^{-1}\left[P_i^* = P_i = \sum_{j=1,2,\ldots,N}^{j \neq i} \frac{V_{dci}V_{dcj}}{2\pi f_s L_{ij}}(\varphi_{is} - \varphi_{js})\left(1 - \frac{|\varphi_{is} - \varphi_{js}|}{\pi}\right)\right], \\ i = 2, \ldots, N \end{cases}$$

where $P_i^*$ represents a reference power of an $i_{th}$ DC source, $P_i$ represents an average power of the $i_{th}$ DC source, fs represents switching frequencies of the first to $N_{th}$ full-bridge converters, and $V_{dci}$ and $V_{dcj}$ represent a voltage of the $i_{th}$ DC source and a voltage of a $j_{th}$ DC source, respectively;
the power decoupling control matrix H of the magnetic network energy router in S3 is calculated by a formula as follows:

$$H = \left| \frac{1}{2\pi f_s} \begin{bmatrix} \left( \sum_{j=1,3,\ldots,N} \frac{V_{dcj}}{L_{2j}} \left(1 - \frac{2}{\pi}|\varphi_{2s} - \varphi_{js}|\right) \right) & \ldots \\ -\frac{V_{dcj}}{L_{2j}} \left(1 - \frac{2}{\pi}|\varphi_{2s} - \varphi_{is}|\right) & \ldots \\ -\frac{V_{dcN}}{L_{2N}} \left(1 - \frac{2}{\pi}|\varphi_{2s} - \varphi_{Ns}|\right) & \ldots \\ \ldots & \ldots \\ \ldots & \ldots \\ -\frac{V_{dc2}}{L_{2i}} \left(1 - \frac{2}{\pi}|\varphi_{2s} - \varphi_{is}|\right) & \ldots \\ \left( \sum_{j=1,\ldots,k-1,k+1,\ldots,N} \frac{V_{dcj}}{L_{ij}} \left(1 - \frac{2}{\pi}|\varphi_{is} - \varphi_{js}|\right) \right) & \ldots \\ -\frac{V_{dcN}}{L_{iN}} \left(1 - \frac{2}{\pi}|\varphi_{is} - \varphi_{Ns}|\right) & \ldots \\ \ldots & \ldots \\ \ldots & \ldots \\ -\frac{V_{dc2}}{L_{2N}} \left(1 - \frac{2}{\pi}|\varphi_{2s} - \varphi_{Ns}|\right) & \ldots \\ -\frac{V_{dci}}{L_{iN}} \left(1 - \frac{2}{\pi}|\varphi_{is} - \varphi_{Ns}|\right) & \ldots \\ \left( \sum_{j=1,2,\ldots,N-1} \frac{V_{dcj}}{L_{Nj}} \left(1 - \frac{2}{\pi}|\varphi_{Ns} - \varphi_{js}|\right) \right) & \ldots \end{bmatrix} \right|^{-1}$$

where $\varphi_{2s}, \ldots, \varphi_{Ns}$ represent steady-state control phase shift angles of the second to $N_{th}$ full-bridge converters; the control phase shift angle micro-increments $\Delta\varphi_2, \ldots, \Delta\varphi_N$ being calculated by the power closed-loop control in S4 comprises the following steps of: R1, taking a DC source with a constant voltage and without power control requirements as a first DC source, and R2. performing real-time sampling and calculating the average power $P_i$ of the ith DC source, comparing $P_i$ with the reference power $P_i^*$ of the ith DC source for a difference, and determining $\Delta\varphi_2, \ldots, \Delta\varphi_N$ by a proportional-integral controller, $\Delta\varphi_2, \ldots, \Delta\varphi_N$ being calculated by a formula as follows:

$$\Delta\varphi_i = K_p(P_i^* - R_i) + K_i \int (R_i^* - P_i) dt, i=2, \ldots, N$$

where $K_p$ represents a proportionality coefficient of the power closed-loop control, and $K_i$ represents an integral coefficient of the power closed-loop control; and the control phase shift angles $\varphi_1, \ldots, \varphi_N$ in S5 are calculated by a formula as follows:

$$\begin{cases} \varphi_1 = \varphi_{1s} = 0; \\ \begin{bmatrix} \varphi_2 \\ \ldots \\ \varphi_k \\ \ldots \\ \varphi_N \end{bmatrix} = \begin{bmatrix} \varphi_{2s} \\ \ldots \\ \varphi_{ks} \\ \ldots \\ \varphi_{Ns} \end{bmatrix} + H \begin{bmatrix} \Delta\varphi_2 \\ \ldots \\ \Delta\varphi_k \\ \ldots \\ \Delta\varphi_N \end{bmatrix} \end{cases}$$

where $k=2, \ldots, N$, wherein the first to $N_{th}$ distributed magnetic core columns, the first to second magnetic flux leakage core columns, and the first to second magnetic plates are made of the same soft magnetic material; the first to $N_{th}$ distributed magnetic core columns have the same cross-sectional areas and lengths; and the first to second magnetic flux leakage core columns have the same cross-sectional areas and lengths, a certain air gap being left between the first and second magnetic flux leakage core columns.

2. The control method for a multi-port magnetic network energy router according to claim 1, wherein the magnetic network energy router has N ports, and each of the full-bridge converters comprises first to fourth reverse conducting insulated gate bipolar transistors (RC-IGBTs), a DC capacitor, and a DC source, wherein a collector electrode of a first RC-IGBT and a collector electrode of a third RC-IGBT are connected to the DC capacitor and a positive electrode of the DC source, respectively; an emitter electrode of a second RC-IGBT and an emitter electrode of a fourth RC-IGBT are connected to the DC capacitor and a negative electrode of the DC source, respectively; an emitter electrode of the first RC-IGBT is connected to a collector electrode of the second RC-IGBT, a connection point therebetween being connected to lower ends of the first to Nin power windings; and an emitter electrode of the third RC-IGBT is connected to a collector electrode of the fourth RC-IGBT, a connection point therebetween being connected to upper ends of the first to $N_{th}$ power windings.

3. The control method for a multi-port magnetic network energy router according to claim 2, wherein the equivalent connection inductance $L_{ij}$ of the $i_{th}$ full-bridge converter and of the $j_{th}$ full-bridge converter in S1 is calculated by a formula as follows:

$$L_{ij} = -\frac{1}{Y_{ij}}$$

where $Y_{ij}$ represents an element in an $i_{th}$ row and $j_{th}$ column of an equivalent admittance matrix Y of the magnetic network energy router, Y being calculated by a formula as follows:

$$Y = \begin{bmatrix} Y_{11} & \ldots & Y_{1i} & \ldots & Y_{1N} \\ \ldots & \ldots & \ldots & \ldots & \ldots \\ Y_{i1} & \ldots & Y_{ii} & \ldots & Y_{iN} \\ \ldots & \ldots & \ldots & \ldots & \ldots \\ Y_{N1} & \ldots & Y_{Ni} & \ldots & Y_{NN} \end{bmatrix} =$$

$$\begin{bmatrix} L_1 & \ldots & k_{1i}\sqrt{L_1 L_i} & \ldots & k_{1N}\sqrt{L_1 L_N} \\ \ldots & \ldots & \ldots & \ldots & \ldots \\ k_{i1}\sqrt{L_i L_1} & \ldots & L_i & \ldots & k_{iN}\sqrt{L_i L_N} \\ \ldots & \ldots & \ldots & \ldots & \ldots \\ k_{N1}\sqrt{L_N L_1} & \ldots & k_{Ni}\sqrt{L_N L_i} & \ldots & L_N \end{bmatrix}^{-1}$$

where $L_1, \ldots, L_i, \ldots, L_N$ represent open circuit inductance of the first, $\ldots, i_{th}, \ldots, N_{th}$ power windings, respectively, and $k_{ij}$ represents a coupling coefficient between an $i_{th}$ power winding and a $j_{th}$ power winding in the magnetic network energy router.

4. An electronic device, comprising a memory, a processor and a computer program stored in the memory and runnable on the processor, wherein when the processor executes the computer program, steps of a control method according to claim 1 are implemented.

5. An electronic device, comprising a memory, a processor and a computer program stored in the memory and runnable on the processor, wherein when the processor executes the computer program, steps of a control method according to claim 2 are implemented.

* * * * *